United States Patent [19]

Henter, Jr.

[11] 4,133,555

[45] Jan. 9, 1979

[54] HYDRAULIC SUSPENSION SYSTEM FOR VEHICLE WHEELS

[76] Inventor: Theodore C. Henter, Jr., 127 E. Montgomery Crrd., Savannah, Ga. 31406

[21] Appl. No.: 823,057

[22] Filed: Aug. 9, 1977

[51] Int. Cl.² ............................................. B60G 11/26
[52] U.S. Cl. .................................................. 280/709
[58] Field of Search ............... 280/702, 704, 708, 709, 280/711, 714

[56] References Cited

U.S. PATENT DOCUMENTS

| | | | |
|---|---|---|---|
| 3,854,710 | 12/1974 | Nicholls | 280/709 |
| 3,892,424 | 7/1975 | Takahashi et al. | 280/709 |

Primary Examiner—Richard A. Bertsch
Attorney, Agent, or Firm—David H. Semmes

[57] ABSTRACT

An hydraulic suspension system for vehicle wheels including an upright hydraulic cylinder and an inverted hydraulic cylinder mounted on each side of the vehicle axle, the piston rod of each hydraulic cylinder extending to said axle. Hydraulic fluid transmission lines extending from the head of each hydraulic cylinder to its diametrically opposed hydraulic center on the other side of the wheel. Thus, a vertical movement of the vehicle axle, as the wheel goes out of alignment, induces a counterflow of the hydraulic fluid from the affected hydraulic into the diametrically opposed hydraulic cylinder on the other end of the axle, thus aligning wheel and axle.

9 Claims, 3 Drawing Figures

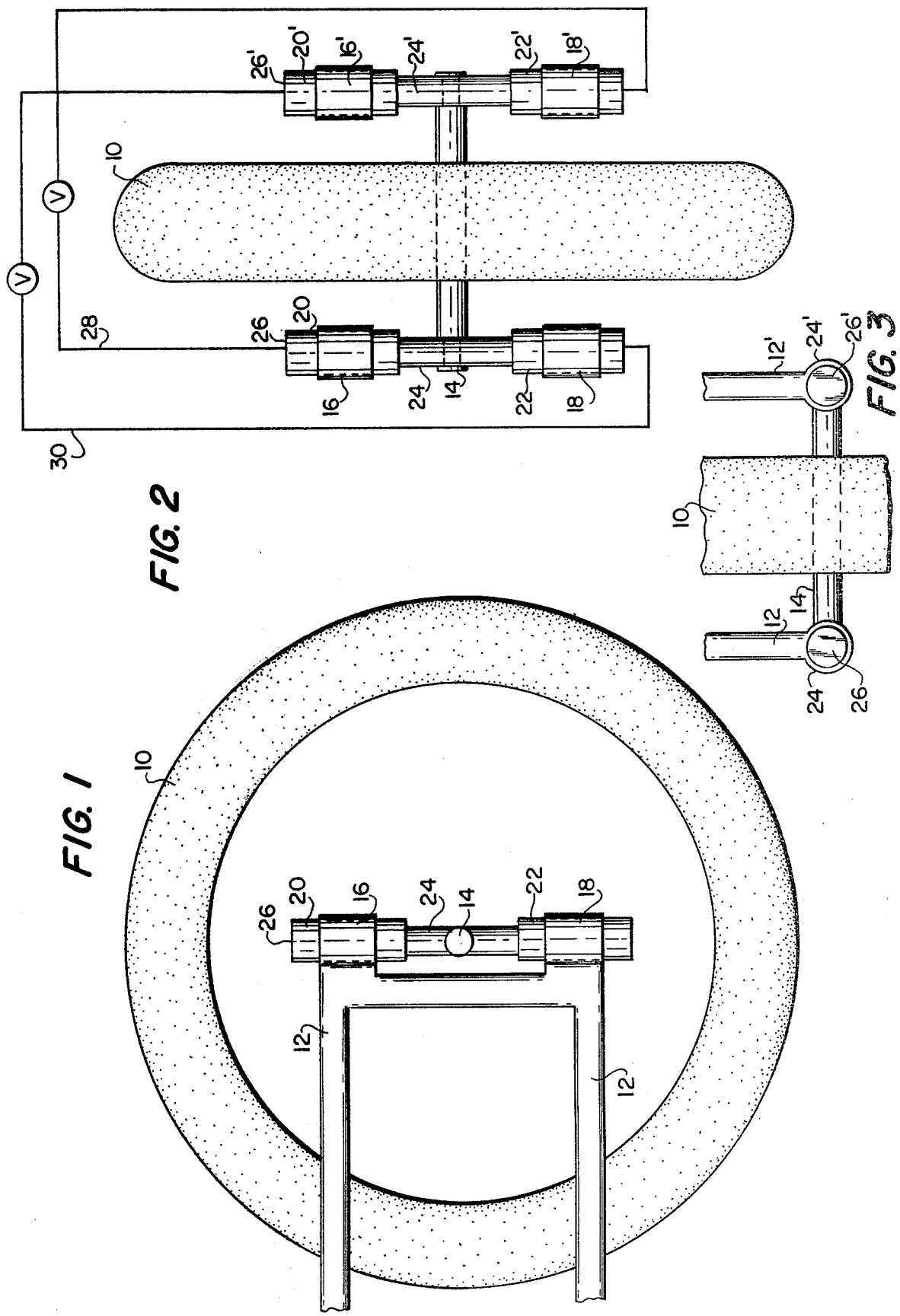

HYDRAULIC SUSPENSION SYSTEM FOR VEHICLE WHEELS

BACKGROUND OF THE INVENTION

1. Field of the Invention

Stabilization or suspension systems for vehicle wheels, particularly, hydraulic damping systems wherein a misaligning move of the wheel axle at one end induces a corresponding correcting move of the wheel axle on the other end.

2. Description of the Prior Art

The following references have been selected:
BLANKENHEIM; U.S. Pat. No. 896,078
MISTRAL; U.S. Pat. No. 2,253,190
WEBER; U.S. Pat. No. 3,563,566
ENKE; U.S. Pat. No. 3,752,497
NICHOLLS; U.S. Pat. No. 3,854,710

Blandenheim discloses a motorcycle having a rear wheel axle 32 with a pistonlike member 34 positioned at both sides (or ends) of the axle and extending upwardly and downwardly from the axle. The ends of pistion member 34 (35, 36) are mounted in tubes 18 and 28 and bear against springs 20, 31.

Mistral (FIG. 5) reveals a vehicle suspension system employing a pair of double acting hydraulic cylinders. The arrangement is such that fluid communication exists between the top of one cylinder and the bottom of the other, such as by conduits 80, 82. Conduits 78, 81 complete the cross conduit arrangement.

Weber shows a suspension system (FIG. 2) employing two hydraulic cylinders 34 and a double acting piston 36 mounted in each cylinder. Fluid communication exits between the top of one cylinder and the botton of the other cylinder, such as by conduit 66. Further conduit 68 curves communication between the top of the other cylinder and the bottom of the one cylinder.

Enke (assigned to Daimler-Benz) sets forth a suspension system for a vehicle utilizing two double acting hydraulic cylinders (10a, 10b) with pistons 12a and 12b mounted therein. Upon tilting of the vehicle, the hydraulic fluid in chamber 22a (on top of piston 12a) is urged to flow to chamber 24b to bottom of piston 12b to exert a counterbalancing force via conduit 44. A similar arrangement exists with relation to conduit 42.

Nicholls relates to a motorcycle having a suspension system including a ram 1 on either side of the rear wheel of the cycle (FIG. 1). The rams 1 are of the pneumatic type with a conduit 2 placing the top of the rams in fluid communication.

The prior art devices have employed mechanical linkage or hydraulic systems for suspending a pair of automobile wheels but have not suggested a system which could be applied to a single wheel of the vehicle and which could operate independently to align the single wheel with the vehicle frame. Further, it is submitted that the prior art is devoid of any suggestion of employing a first pair of an upright hydraulic cylinder and an inverted hydraulic cylinder on one end of the wheel axle and a second pair of upright and inverted hydraulic cylinders on the other end of the wheel axle with interconnecting hydraulic transmission lines such that a misalignment on one end of the axle induces a corresponding correcting movement on the other end.

SUMMARY OF THE INVENTION

According to the present invention, the vehicle wheel and its supporting horizontal axle are aligned by a first pair of upright and inverted hydraulic cylinders on one end of the axle and a second pair of upright and inverted hydraulic cylinders on the other end of the axle. Piston rods extend from the cylinder towards the axle. Hydraulic transmission lines interconnect the head of the upright cylinder on one end to the head of the inverted cylinder on the other end. Also the head of the inverted cylinder in the first pair is connected to the head of the upright cylinder in the second pair. Thus, a misaligning move of the axle on one end induces an hydraulic flow into the diametrically opposed cylinder, so as to align the axle.

BRIEF DESCRIPTION OF THE DRAWINGS

FIG. 1 is a fragmentary side elevation showing a bifurcation of the vehicle frame supporting a first pair of upright and inverted hydraulic cylinders on one side of a vehicle wheel;

FIG. 2 is an end elevation, showing the first pair of upright and inverted hydraulic cylinders supported on the end of the axle and the second pair of upright and inverted hydraulic cylinders supported on the other end with interconnecting hydraulic transmission lines.

FIG. 3 is a fragmentary top plan, showing the upright cylinder heads.

DESCRIPTION OF THE PREFERRED EMBODIMENTS

In FIG. 1 there is shown a vertically aligned vehicle wheel 10 mounted upon horizontal axle 14. A bifurcated portion of the frame includes horizontally extending support members 12 and 12', defining an upright cylinder bracket 16 and an inverted cylinder bracket 18. A piston rod housing 24 is mounted upon the wheel axle so as to extend above and below the axle for support of upright cylinder 20 and inverted cylinder 22. The upright cylinder heads 26, 26' are illustrated in FIG. 3. Each cylinder includes a piston rod in contact with the axle reduced diameter portion.

As illustrated in FIG. 2, the second pair of upright and inverted hydraulic cylinders 20' and 22' includes like elements. Hydraulic transmission line 28 extends from head 26 of the upright cylinder 20 to the head of the inverted cylinder 22' in the second pair. Correspondingly, an hydraulic transmission line 30 extends from the head of inverted cylinder 22 in the first pair to the head 26' of the upright cylinder 20' in the second pair. Thus, an axle 14 through a misaligning move may actuate the piston rod in the first pair, a counterflow of hydraulic pressure causes a corresponding move of the diametrically opposed piston in the second pair, so as to maintain the wheel axle in alignment. A common piston may run between the two cylinders and the axle 14 may be attached to the common piston at a point that does not restrict movement of the piston into either the upright or the inverted cylinder. Alternatively, separate piston rods may be employed for each cylinder. Thus, the wheel is permitted to move vertically by the pistons moving up and down in the cylinders, but the wheel cannot tilt relative to the frame of the vehicle. As one piston attempts to move upwardly in the cylinder it forces incompressible fluid into the diametrically opposed cylinder which causes its piston to rise a like amount. Thus the axle is always maintained horizontally relative to the vertical axis of the vehicle and the vertical axis of the wheel is kept parallel to the vertical axis of the vehicle frame.

Therefore, it can be seen that the present invention teaches an advantageous suspension for a single track vehicle, such as a motorcycle. The four pistons will work to allow the axle, 14, to move only vertically without exerting any stabilizing forces; since, of course, none is needed when the axle, 14, is simply being moved vertically relative to the vertically extending wheel, 10. It should be appreciated that the present device is fixed to the bifurcated frame of the vehicle, i.e., the extending yoke defined by the members 12 and 12'. Hence, the present system focuses upon maintaining the single axle, 14, perpendicular to the planes of either of the bifurcated frame members, in order to correct misalignments of the axle on a vehicle such as a motorcycle.

It should also be appreciated that the vertical extent of the upright cylinder and inverted cylinder on a given side of the wheel axle may be shortened, in its vertical extent, by combining the upright cylinder bracket and the inverted cylinder bracket to enclose a double acting form of piston on the piston rod which is rigidly attached to the housing. In the preferred embodiment shown in FIGS. 1-3, the center line of the upright cylinder is shown co-linear to the center line of the inverted cylinder on each side, though the present invention contemplates that the vertically extending cylinders may also be other than co-linear, as shown.

The present suspension system would also be applicable to other than single track vehicles, if each wheel were to be encompassed by a bifurcated housing so that the corrective action of the present invention could apply an alignment of the individual wheel back to a vertical position within the bifurcated housing. Hence, the present invention has for its purpose the correction of the wheel alignment for a given wheel relative to bifurcated housing, an application which is uniquely presented and easily understood with reference to such single track vehicles as motorcycles. Manifestly, variations in the frame support structure and the in-line relationship of cylinders may be made without departing from the definition of the present invention which is to be defined solely by the scope of the appended claims.

I claim:

1. An hydraulic suspension system for vehicle wheels comprising:
    a. a horizontally extending bifurcated frame defining on each bifurcation an upright cylinder bracket and an inverted cylinder bracket, said bifurcation defining an intervening wheel well;
    b. a pair of vertically extending piston rod housings extending between said upright cylinder bracket and said inverted cylinder bracket on each side of said wheel well;
    c. a wheel axle mounted upon a horizontal axis and extending between said pair of vertically extending piston rod housings;
    d. a wheel mounted upon said axle and in vertical alignment with said frame bifurcations defining said wheel well;
    e. an upright hydraulic cylinder mounted in said upright cylinder bracket and an inverted hydraulic cylinder mounted in said inverted cylinder bracket on each bifurcation, each hydraulic cylinder having a head and a corresponding piston rod extending towards said axle;
    f. an hydraulic transmission line extending intermediate the head of said upright cylinder on one side and the head of said inverted cylinder on the opposed side of said bifurcation and an hydraulic transmission line extending from the head of said inverted cylinder on one side to the head of said upright cylinder on the opposed side of said bifurcation such that vertical movement of said axle and said piston rids on one side invokes an hydraulic counterflow from the affected hydraulic cylinder to its connected counterpart on the opposed side, so as to maintain said wheel in alignment with said bifurcation.

2. An hydraulic suspension system for vehicle wheels as in claim 1, said mounting brackets encircling said hydraulic cylinders.

3. An hydraulic suspension system for vehicle wheels as in claim 2, said hydraulic cylinders being of larger diameter than said piston rod housings.

4. An hydraulic suspension system for vehicle wheels as in claim 3, said upright cylinder and said inverted cylinder being aligned with the vertical axis of said frame.

5. A hydraulic suspension system for vehicle wheels as in claim 4, including valve means in said hydraulic lines as a damping control.

6. An hydraulic suspension system for vehicle wheels as in claim 5, said axle including a reduced diameter portion at each end and extending through said piston rod housings.

7. An hydraulic suspension system for vehicle wheels as in claim 6, said cylinder brackets being foreshortened with respect to said upright and inverted cylinders.

8. An hydraulic suspension system for vehicle wheels as in claim 7, said hydraulic lines extending above said wheel well.

9. An hydraulic suspension system for vehicle wheels as in claim 1, wherein a common piston rod extends between the hydraulic cylinders in each pair in contact with said axle.

* * * * *